United States Patent
Delorme et al.

(10) Patent No.: US 9,198,123 B2
(45) Date of Patent: Nov. 24, 2015

(54) COMMUNICATION SYSTEM AND METHOD

(71) Applicant: Nvidia Corporation, Santa Clara, CA (US)

(72) Inventors: Flavien Delorme, Sophia Antipolis (FR); Bruno De Smet, Sophia Antipolis (FR)

(73) Assignee: Nvidia Corporation, Santa Clara, CA (US)

( * ) Notice: Subject to any disclaimer, the term of this patent is extended or adjusted under 35 U.S.C. 154(b) by 347 days.

(21) Appl. No.: 13/754,104

(22) Filed: Jan. 30, 2013

(65) Prior Publication Data

US 2014/0211692 A1 Jul. 31, 2014

(51) Int. Cl.
*H04W 48/18* (2009.01)

(52) U.S. Cl.
CPC ..................... *H04W 48/18* (2013.01)

(58) Field of Classification Search
CPC .................................................. H04W 48/18
See application file for complete search history.

(56) References Cited

U.S. PATENT DOCUMENTS

| | | | | |
|---|---|---|---|---|
| 2009/0047016 A1* | 2/2009 | Bernard | .............. | H04L 12/5692 398/43 |
| 2010/0260125 A1* | 10/2010 | Lee | .................... | H04L 65/1069 370/329 |
| 2011/0170517 A1* | 7/2011 | Bakker | ............. | H04W 36/0033 370/331 |
| 2013/0005260 A1* | 1/2013 | Hosono | ............... | H04M 1/6091 455/41.2 |

OTHER PUBLICATIONS

3rd Generation Partnership Project; Technical Specification Group Services and System Aspects; General Packet Radio Service (GPRS); Service Description; Stage 2 (Release 10), 3GPP TS 23.060, V10.10.0, Dec. 2012, 324 pages.

3rd Generation Partnership Project; Technical Specification Group Core Network and Terminals; Mobile Radio Interface Layer 3 Specification; Core Network Protocols; Stage 3, (Release 12), 3GPP TS 24.008, V12.0.0, Dec. 2012, 678 pages.

* cited by examiner

*Primary Examiner* — Ajay Cattungal (57) ABSTRACT

A modem is disclosed, one embodiment including: first and second interface apparatuses; and a processing apparatus arranged to transmit a request message to part of a wireless cellular network to request establishment of a channel to access a packet-based network, wherein the request message requests the channel as being of a type that supports both a first and second version of a packet protocol; receive a response message indicating rejection of the request, and upon detecting that a field in the response message defines a reason other than the part of the wireless cellular network does not support first and second versions of the packet protocol on a single channel, to default to transmit a default request message to request establishment of a channel to access the packet-based network, the default request message requests the channel as being of a type that supports the first version of the packet protocol.

29 Claims, 2 Drawing Sheets

COMMUNICATION SYSTEM AND METHOD

TECHNICAL FIELD

This disclosure relates to establishing a channel between a modem and an access point, e.g. to access the Internet via a 3rd Generation Partnership Project (3GPP) network.

BACKGROUND

Figure 1:
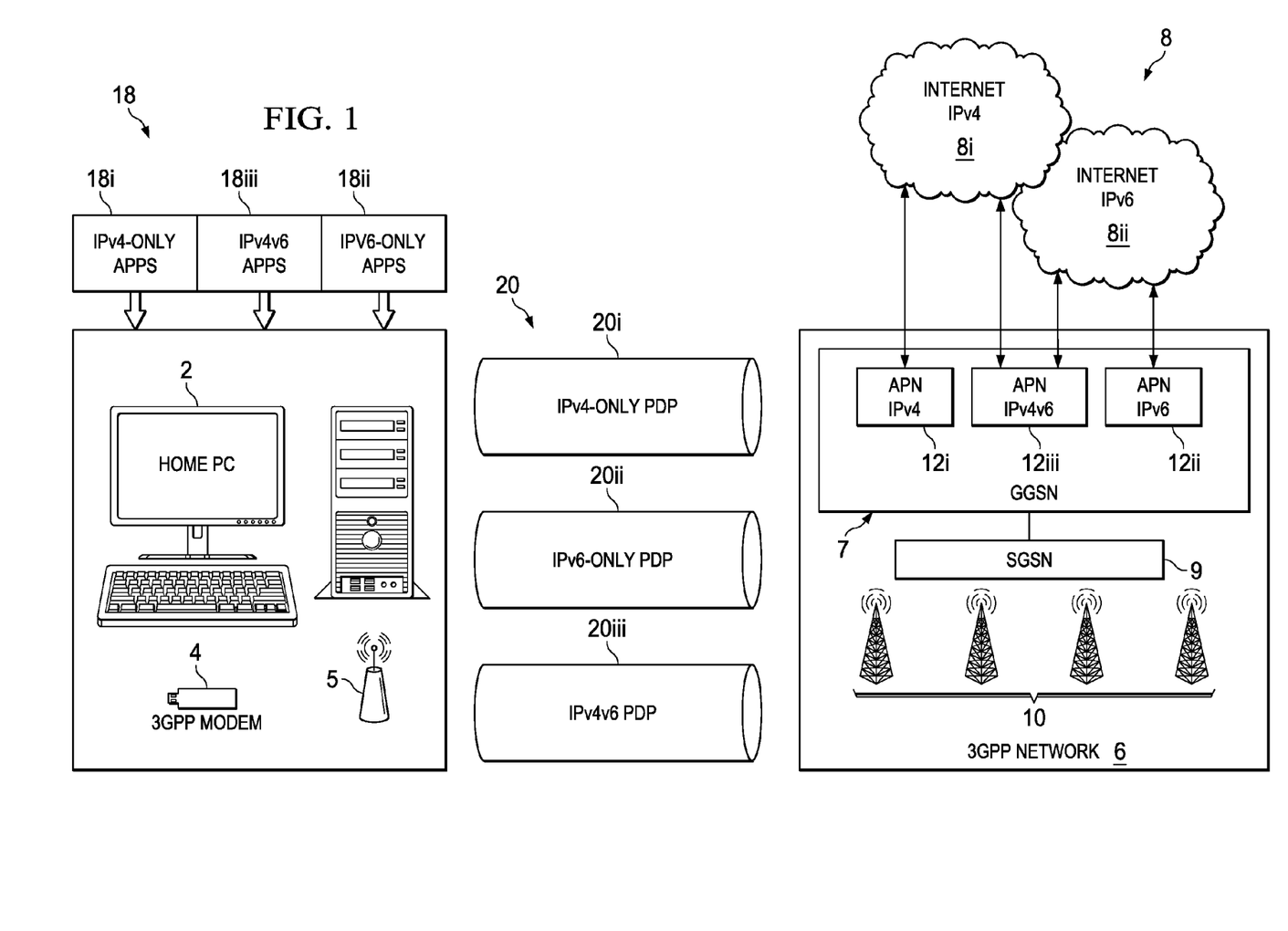
FIG. 1 is a schematic illustration of a communication system in which disclosed embodiments may be applied.

FIG. 1 is a schematic block diagram of a communication system comprising a host terminal 2 and an external wireless cellular modem 4, the modem 4 comprising an antenna 5. The host terminal 2 may be a user terminal, and may for example take the form of a desktop computer, laptop computer, tablet style computer, or mobile phone (which may be referred to as a "smart phone"). The modem 4 may for example take the form of a dongle for plugging into the host terminal 2. Alternatively the modem 4 may take the form of a mobile phone handset which, as well as being a conventional mobile telephone, can be connected to the host terminal 2 so as to act as an external cellular modem for the host terminal 2. The modem 4 is external to the host terminal 2 in that it is a separate unit housed in a separate casing, but which is connected or connectable to the host terminal 2 by means of a wired or wireless connection (as well as being removable or being able to be disconnected from the host terminal 4). In another alternative set up, the modem 4 could be internal to the terminal 4, e.g. taking the form of a wireless module in a desktop or laptop computer.

The system also comprises a mobile cellular network 6 such as a 3GPP network; and a further, packet-based network 8, that can be a wide area internetwork such as the Internet. The networks are coupled together by one or more gateway routers (not shown). The mobile cellular network 6 comprises a plurality of antennas 10 operatively coupled to a serving support entity 9. An interface exists between the serving support entity 9 and a gateway support entity 7. The gateway support entity 7 is operatively coupled to the gateway routers.

The serving support entity 9 may be a SGSN (serving GPRS support node) in a 2G or 3G system, or a Serving Gateway (SGW) in a LTE (Long Term Evolution) system. The gateway support entity 7 may be a GGSN (Gateway GPRS Support Node) in a 2G or 3G system, or a Packet Data Network (PDN) Gateway (PGW) in a LTE system. The GGSN 7 or other such gateway support entity is configured to provide one or more access points 12 which enable a terminal such as the host terminal 2 to access the Internet 8 via the mobile cellular network 6. Each of the access points 12 has a respective name which is used by a terminal 2 and modem 4 to request use of the access point for accessing the Internet 8. The name of an access point may be referred to as the APN (access point name), and the term APN is sometimes used interchangeably with reference to the access point itself. An APN maps to a specific gateway to a specific PDN (packet data network), for a specific service (e.g. Web browsing, MMS or WAP). Several APNs may map to the same gateway. The APN corresponds to a specific service or a set of services that are provided by one unique gateway.

For connecting to the 3GPP network 6 or other such cellular network, the modem 4 comprises a first physical interface apparatus comprising a wireless transceiver, typically in the form of a radio frequency (RF) transceiver and an antenna 5. This interface apparatus of the modem 4 connects via an antenna 10 to the mobile cellular network 6, enabling the modem 4 to establish a channel 20 between itself and one of the access points 12 provided by the GGSN 7 of the mobile cellular network 6. This channel may be referred to as a "context". For example, if the mobile cellular network 6 is a 3GPP network, then the connection between the modem 4 and a 3GPP network 6 may be called a PDP (Packet Data Protocol) context in 2G or 3G terminology, and an EPS (Evolved Packet System) bearer context in LTE (Long Term Evolution standards) terminology. The context 20 comprises parameters for establishing the connection with the access point 12, such as context type, quality-of-service (QoS) parameters, authentication type and information of a domain name system. The physical medium of the connection is typically a radio channel such as a 2G, 3G or LTE radio channel and the protocol that drives it may comprise a set of protocol layers as defined for example by 3GPP. Each of the one or more access points 12 connects on to a router of the Internet 8. The first router encountered on the route onwards from the mobile cellular network 6, i.e. the router immediately connecting to the access point 12, is the gateway between the cellular network 6 and the Internet 8.

For connecting to the host terminal 2, the modem 4 comprises second physical interface apparatus. The second interface, between the host 2 and modem 4, could for example comprise a wired connection such as USB, or a short-range wireless transceiver such as an infrared connection or a radio frequency connection (e.g. Bluetooth).

The host terminal 2 is installed with one or more applications 18 which when executed on the host terminal 2 send and/or receive communications over the Internet 8 via the first and second interface apparatuses, wireless cellular network 6, access point 12 and the relevant gateway, over the established context 20, supported by the GGSN 7. The system allows the host terminal to access the Internet 8 using a suitable packet protocol or communication protocol stack comprising one or more packet protocol layers implemented at the modem 4 and at one or more nodes of the mobile network 6 and Internet 8, e.g. using an Internet Protocol version 6 (IPv6) stack and/or Internet Protocol version 4 (IPv4) stack. The host terminal 2 may be installed with and run one or more applications 18*i* that operate exclusively based on use of IPv4, one or more applications 18*ii* that operate exclusively based on use of IPv6, and/or one or more applications 18*iii* configured to make use of a mixture of IPv4 and IPv6 features ("dual-stack connectivity"). To this end, the modem 4 may be operable to establish a context 20*i* of a type which operates exclusively based on IPv4, to establish a context 20*ii* of a type which operates exclusively based on IPv6, and/or to establish a context 20*iii* of a type which can support both IPv4 and IPv6.

Reference is also made to 3GPP TS 23.060 section 9.2, and 3GPP TS 24.008.

SUMMARY

In one aspect, a modem is disclosed for use at a terminal. In one embodiment, the modem includes: (1) first interface apparatus comprising a first wireless transceiver arranged to connect to a wireless cellular network, (2) second interface apparatus arranged to connect to the terminal and (3) processing apparatus arranged to transmit a first request message to a part of the wireless cellular network to request establishment of a channel to access a further, packet-based network via the first interface apparatus, wherein the first request message requests the channel as being of a type that supports both a first and second version of a packet protocol, wherein the processing apparatus is further arranged to receive a first response message via the first interface apparatus, the first response message indicating rejection of the first request and wherein the processing apparatus is further arranged, upon detecting that a field in the first response message defines a reason other than the part of the wireless cellular network does not support first and second versions of the packet protocol on a single channel, to default to transmit a default request message to the part of the wireless cellular network to request establishment of a channel to access the further, packet-based network via the first interface apparatus, wherein the default request message requests the channel as being of a type that supports the first version of the packet protocol.

In another aspect, a computer program product is disclosed for operating a modem for use at a terminal, the modem having a processing apparatus, a first interface apparatus including a first wireless transceiver for connecting to a wireless cellular network, and a second interface apparatus for connecting to the terminal. In one embodiment, the computer program product includes code embodied on a non-transitory computer-readable medium and configured so as when executed on the processing apparatus of the modem to: transmit a first request message to a part of the wireless cellular network to request establishment of a channel to access a further, packet-based network via the first interface apparatus, wherein the first request message requests the as being of a type that supports both a first and second version of a packet protocol, wherein the processing apparatus is configured to receive a first response message via the first interface apparatus, the first response message indicating rejection of the first request, and the code is configured so as when executed to, upon detecting that a field in the first response message defines a reason other than the part of the wireless cellular network does not support first and second versions of the packet protocol on a single channel, transmit a default request message to the part of the wireless cellular network to request establishment of a channel to access the further, packet-based network via the first interface apparatus, wherein the default request message requests the channel as being of a type that supports the first version of the packet protocol.

In yet another aspect, a method of operating a modem at a terminal is disclosed, the modem having a first interface apparatus comprising a first wireless transceiver for connecting to a wireless cellular network, a second interface apparatus for connecting to the terminal. In one embodiment, the method includes: (1) transmitting a first request message to a part of the wireless cellular network to request establishment of a channel to access a further, packet-based network via the first interface apparatus, wherein the first request message requests the as being of a type that supports both a first and second version of a packet protocol, (2) receiving a first response message via the first interface apparatus, the first response message indicating rejection of the first request and (3) upon detecting that a field in the first response message defines a reason other than the part of the wireless cellular network does not support first and second versions of the packet protocol on a single channel, the method further including transmitting a default request message to the part of the wireless cellular network to request establishment of a channel to access the further, packet-based network via the first interface apparatus, wherein the default request message requests the channel as being of a type that supports the first version of the packet protocol.

In still yet another aspect, a system is disclosed. In one embodiment, the system includes: (1) a terminal, (2) a wireless cellular network and (3) a modem for use at the terminal. The modem having: (3A) first interface apparatus comprising a first wireless transceiver arranged to connect to a wireless cellular network, (3B) second interface apparatus arranged to connect to the terminal and (3C) processing apparatus arranged to transmit a first request message to a part of the wireless cellular network to request establishment of a channel to access a further, packet-based network via the first interface apparatus, wherein the first request message requests the channel as being of a type that supports both a first and second version of a packet protocol, wherein the processing apparatus is further arranged to receive a first response message via the first interface apparatus, the first response message indicating rejection of the first request and wherein the processing apparatus is further arranged, upon detecting that a field in the first response message defines a reason other than the part of the wireless cellular network does not support first and second versions of the packet protocol on a single channel, to default to transmit a default request message to the part of the wireless cellular network to request establishment of a channel to access the further, packet-based network via the first interface apparatus, wherein the default request message requests the channel as being of a type that supports the first version of the packet protocol.

BRIEF DESCRIPTION OF THE DRAWINGS

For a better understanding of the disclosed embodiments and to show how these may be put into effect, reference by way of example is made to the accompanying drawings in which.

DETAILED DESCRIPTION

For illustrative purposes consider a user equipment operating according to 3GPP Release 8 (or higher), which provides for a context type "IPv4v6" thus can handle both IPv4 communications and IPv6 communications over the same context, and is able to run an application 18$iii$ which uses a mixture of IPv4 and IPv6, i.e. using dual-stack connectivity. This user equipment is able to initiate activation of a PDP context 20$iii$ by transmitting a request message to the SGSN 9. The user equipment may receive a rejection message from the SGSN 9. This rejection message includes a value to indicate why the request message was rejected. A list of reject causes and their associated values can be found in 3GPP TS 24.008 in section 10.5.6.6. The 3GPP standards currently specify the behaviour of the user equipment upon receiving only a very limited number of reject cause values in a rejection message. For any other reject causes the behaviour of the user equipment is not described in the 3GPP standards which implies that the user equipment fails activation and no further action is taken.

In embodiments disclosed herein, the user equipment is able to determine that a request for a channel of a type that supports both a first and second version of a packet protocol to access a packet based network has been rejected based on a rejection message. If a reason included in the rejection message does not indicate that the request failed due to a wireless cellular network (to which the request was transmitted) not supporting the first and second versions of the packet protocol in a single channel, the user equipment is able to default to request for a channel of a type that supports the first version of the packet protocol to access the packet based network.

According to one aspect noted above, the disclosure provides a modem for use at a terminal wherein in one embodiment the modem includes: first interface apparatus comprising a first wireless transceiver arranged to connect to a wireless cellular network; second interface apparatus arranged to connect to the terminal; and processing apparatus arranged to transmit a first request message to a part of the wireless cellular network to request establishment of a channel to access a further, packet-based network via the first interface apparatus, wherein the first request message requests the channel as being of a type that supports both a first and second version of a packet protocol; wherein the processing apparatus is further arranged to receive a first response message via the first interface apparatus, the first response message indicating rejection of the first request, wherein the processing apparatus is further arranged, upon detecting that a field in the first response message defines a reason other than the part of the wireless cellular network does not support first and second versions of the packet protocol on a single channel, to default to transmit a default request message to the part of the wireless cellular network to request establishment of a channel to access the further, packet-based network via the first interface apparatus, wherein the default request message requests the channel as being of a type that supports the first version of the packet protocol.

The processing apparatus may be configured to receive an acceptance message via the first interface apparatus accepting establishment of the channel in response to the transmission of the second request message when the part of the wireless cellular network supports communications in accordance with the first version of the packet protocol.

The processing apparatus may be configured to receive a second response message via the first interface apparatus when the part of the wireless cellular network does not support communications in accordance with the first version of the packet protocol, the second response message indicating rejection of the second request.

The processing apparatus may be configured to, in response to receiving the second response message, transmit a further default request message to the part of the wireless cellular network to request establishment of a channel to access the further, packet-based network via the first interface apparatus, wherein the further default request message requests the channel as being of a type that supports the second version of the packet protocol.

The processing apparatus may be configured to receive an acceptance message via the first interface apparatus accepting establishment of the channel in response to the transmission of the third request message when the part of the wireless cellular network supports communications in accordance with the second version of the packet protocol.

The processing apparatus may be configured to receive an acceptance message via the first interface apparatus accepting establishment of the channel in response to the transmission of the first request message when the part of the wireless cellular network supports communications in accordance with first and second versions of the packet protocol on a single channel.

The processing apparatus may be arranged to determine if the field in the first response message indicates that the first request was rejected due to the part of the wireless cellular network not supporting communications in accordance with first and second versions of the packet protocol on a single channel.

The channel may comprise one of a PDP context and an EPS bearer context.

The part of the wireless cellular network may comprise one or more access points including an access point that only supports communications in accordance with the first version of the packet protocol, and the processing apparatus is configured to establish a context of a type which allows communications based on the first version of the packet protocol with the access point that only supports communications in accordance with the first version of the packet protocol The part of the wireless cellular network may comprise one or more access points including an access point that only supports communications in accordance with the second version of the packet protocol, and the processing apparatus is configured to establish a context of a type which allows communications based on the second version of the packet protocol with the access point that only supports communications in accordance with the second version of the packet protocol.

The part of the wireless cellular network may comprise one or more access points including an access point that supports communications in accordance with first and second versions of the packet protocol on a single channel, and the processing apparatus is configured to establish a context which allows communications based on the first and second versions of the packet protocol with the access point that supports communications in accordance with first and second versions of the packet protocol on a single channel.

The field in the first response message may include an 8-bit binary value.

The processing apparatus may be arranged to transmit the second request message to the part of the wireless cellular network when the 8-bit binary value has a value other than: 00011100; 00110010; 00110011; or 00110100.

The processing apparatus may be arranged to transmit the second request message to the part of the wireless cellular network when the field in the first response message defines a reason other than: i) the part of the wireless cellular network does not recognise an address or packet protocol version of the first request message; or ii) the part of the wireless cellular network only supports communications in accordance with the first version of the packet protocol; or iii) the part of the wireless cellular network only supports communications in accordance with the second version of the packet protocol; or iv) the part of the wireless cellular network only supports communications in accordance with a single version of a packet protocol on a single channel.

The single version of a packet protocol may be one of the first version of the packet protocol and the second version of the packet protocol.

The first version of the packet protocol may be IPv4. The second version of the packet protocol may be IPv6.

The processing apparatus may be arranged to transmit the first request message to the part of the wireless cellular network in response to receiving a modem command from the terminal via the second interface apparatus.

The further network may the Internet. The wireless cellular network may be a 3GPP network.

The second interface apparatus may comprise a wired connector or connection.

The modem may comprise an external unit for use at the terminal.

The second interface apparatus may comprise a wired connector.

The modem may comprise a dongle housing the processing apparatus and for plugging into the terminal via the second interface apparatus.

The second interface apparatus may comprise a second wireless transceiver for connecting to the terminal via a local wireless connection.

The modem may comprise a mobile phone housing for connecting to the terminal via the second interface apparatus, the mobile phone thus being operable as a telephone and as an external wireless cellular modem for the terminal.

Another aspect of the disclosure presented above is a computer program product for operating a modem for use at a terminal, the modem having a processing apparatus, a first interface apparatus comprising a first wireless transceiver for connecting to a wireless cellular network, and a second interface apparatus for connecting to the terminal. In one embodiment, the computer program product comprises code embodied on a non-transitory computer-readable medium and configured so as when executed on the processing apparatus of the modem to: transmit a first request message to a part of the wireless cellular network to request establishment of a channel to access a further, packet-based network via the first interface apparatus, wherein the first request message requests the as being of a type that supports both a first and second version of a packet protocol; wherein the processing apparatus is configured to receive a first response message via the first interface apparatus, the first response message indicating rejection of the first request, and the code is configured so as when executed to, upon detecting that a field in the first response message defines a reason other than the part of the wireless cellular network does not support first and second versions of the packet protocol on a single channel, transmit a default request message to the part of the wireless cellular network to request establishment of a channel to access the further, packet-based network via the first interface apparatus, wherein the default request message requests the channel as being of a type that supports the first version of the packet protocol.

The processing apparatus may be configured to receive a second response message via the first interface apparatus when the part of the wireless cellular network does not support communications in accordance with the first version of the packet protocol, the second response message indicating rejection of the second request, and the code may be configured so as when executed to, in response to the processing apparatus receiving the second response message, transmit a further default request message to the part of the wireless cellular network to request establishment of a channel to access the further, packet-based network via the first interface apparatus, wherein the further default request message requests the channel as being of a type that supports the second version of the packet protocol.

The code may be configured so as when executed to determine if the field in the first response message indicates that the first request was rejected due to the part of the wireless cellular network not supporting communications in accordance with first and second versions of the packet protocol on a single channel.

The channel may comprise one of a PDP context and an EPS bearer context.

The part of the wireless cellular network may comprise one or more access points including an access point that only supports communications in accordance with the first version of the packet protocol, and the code may be configured so as when executed to establish a context of a type which allows communications based on the first version of the packet protocol with the access point that only supports communications in accordance with the first version of the packet protocol The part of the wireless cellular network may comprise one or more access points including an access point that only supports communications in accordance with the second version of the packet protocol, and the code may be configured so as when executed to establish a context of a type which allows communications based on the second version of the packet protocol with the access point that only supports communications in accordance with the second version of the packet protocol.

The part of the wireless cellular network may comprise one or more access points including an access point that supports communications in accordance with first and second versions of the packet protocol on a single channel, and the code may be configured so as when executed to establish a context which allows communications based on the first and second versions of the packet protocol with the access point that supports communications in accordance with first and second versions of the packet protocol on a single channel.

The field in the first response message may include an 8-bit binary value.

The code may be configured so as when executed to transmit the default request message to the part of the wireless cellular network when the 8-bit binary value has a value other than: 00011100; 00110010; 00110011; or 00110100.

The code may be configured so as when executed to transmit the default request message to the part of the wireless cellular network when the field in the first response message defines a reason other than: i) the part of the wireless cellular network does not recognise an address or packet protocol version of the first request message; or ii) the part of the wireless cellular network only supports communications in accordance with the first version of the packet protocol; or iii) the part of the wireless cellular network only supports communications in accordance with the second version of the packet protocol; or iv) the part of the wireless cellular network only supports communications in accordance with a single version of a packet protocol on a single channel.

The single version of a packet protocol may be one of the first version of the packet protocol and the second version of the packet protocol.

The first version of the packet protocol may be IPv4. The second version of the packet protocol may be IPv6.

The code may be configured so as when executed to transmit the first request message to the part of the wireless cellular network in response to receiving a modem command from the terminal via the second interface apparatus.

The further network may be the Internet. The wireless cellular network may be a 3GPP network.

According to another noted aspect of the disclosure there is provided a method of operating a modem at a terminal, the modem having a first interface apparatus comprising a first wireless transceiver for connecting to a wireless cellular network, a second interface apparatus for connecting to the terminal, wherein in one embodiment the method includes: transmitting a first request message to a part of the wireless cellular network to request establishment of a channel to access a further, packet-based network via the first interface apparatus, wherein the first request message requests the as being of a type that supports both a first and second version of a packet protocol; receiving a first response message via the first interface apparatus, the first response message indicating rejection of the first request, and upon detecting that a field in the first response message defines a reason other than the part of the wireless cellular network does not support first and second versions of the packet protocol on a single channel, the method further including: transmitting a default request message to the part of the wireless cellular network to request establishment of a channel to access the further, packet-based network via the first interface apparatus, wherein the default request message requests the channel as being of a type that supports the first version of the packet protocol.

According to yet another noted aspect, the disclosure provides a system including: a terminal; a wireless cellular network; and a modem for use at the terminal. In one embodiment, the modem includes: first interface apparatus having a first wireless transceiver arranged to connect to a wireless cellular network; second interface apparatus arranged to connect to the terminal; and processing apparatus arranged to transmit a first request message to a part of the wireless cellular network to request establishment of a channel to access a further, packet-based network via the first interface apparatus, wherein the first request message requests the channel as being of a type that supports both a first and second version of a packet protocol; wherein the processing apparatus is further arranged to receive a first response message via the first interface apparatus, the first response message indicating rejection of the first request, wherein the processing apparatus is further arranged, upon detecting that a field in the first response message defines a reason other than the part of the wireless cellular network does not support first and second versions of the packet protocol on a single channel, to default to transmit a default request message to the part of the wireless cellular network to request establishment of a channel to access the further, packet-based network via the first interface apparatus, wherein the default request message requests the channel as being of a type that supports the first version of the packet protocol.

Reference is now made again to FIG. 1, which shows a communication system in which disclosed embodiments may be applied. The host 2 may be any device such as a PC, laptop, or application processor connected to the modem 4 in order to obtain access to the packet-based network 8 via the modem 4 and mobile cellular network 6. The modem 4 is the device that provides a way to send and receive packets between the host 2 and mobile cellular network 6.

Figure 3:
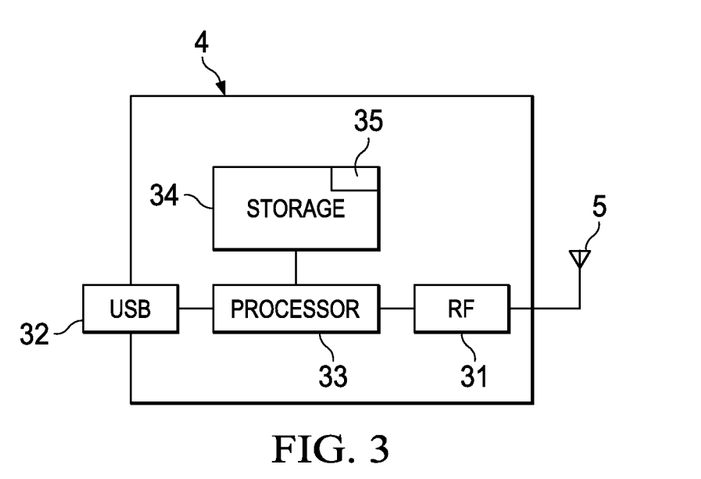
FIG. 3 is a schematic block diagram of an embodiment of an external modem unit constructed according to the principles of the disclosure and for use at a host terminal.

Referring to FIG. 3, the modem 4 may comprise a processor 33 and, operatively coupled to the processor 33, a non-transitory computer-readable storage medium 34 such as a magnetic or electronic memory storing soft-modem code. The code on the storage medium 34 is arranged to be executed on the processor 33, so as when executed to send and receive packets between the host 2 and Internet 8 or other such packet-based network via the mobile cellular network 6, and to perform the additional operations of the modem 4 as discussed below. However, the possibility of some or all of the modem functionality being implemented in dedicated hardware is not excluded.

As mentioned, the modem 4 may for example take the form of a dongle for plugging into the host terminal 2; or may take the form of a mobile phone handset which, as well as being a conventional mobile telephone, can be connected to the host terminal 2 so as to act as an external cellular modem for the host terminal 2. The modem 4 is external to the host terminal 2 in that it is a separate unit housed in a separate casing, but which is connected or connectable to the host terminal 2 by means of a wired or wireless connection (as well as being removable or being able to be disconnected from the host terminal 2). The modem may be configured in a similar manner to that discussed in relation to FIG. 1 above, but with additional functionality added in accordance with the disclosure, an example of which will be discussed in more detail below in relation to FIG. 2.

The cellular network 6 can be a 3GPP network, which connects the modem 4 to a further, packet-based network 8, that can be in the form of a wide area internetwork such as the Internet. For connecting to the 3GPP network 6 or other such cellular network, the modem 4 comprises first physical interface apparatus comprising a wireless transceiver 31, typically in the form of a radio frequency (RF) transceiver, and an antenna 5. The transceiver 31 is operatively coupled to the processing apparatus 33. The connection between the modem 4 and the access point of the GGSN 7 (or SAE gateway or the like) of the cellular 3GPP network, and therefore between the modem 4 and gateway router to the packet based network 8, includes one or more contexts 20 in the form of one or more PDP contexts or one or more EPS bearer contexts.

For connecting the external modem 4 to its host terminal 2, the modem 4 includes second physical interface apparatus 32 operatively coupled to the processing apparatus 33. This second interface 32, between the host 2 and modem 4, could for example include a wired connection such as USB connector, or a short-range wireless transceiver such as an infrared connection or a radio frequency connection (e.g. Bluetooth).

A PDP context is a data channel between the 3GPP modem 4 and the access point 12. It comprises a set of parameters including the following:
   The PDP type, which can be any of:
      IPv4 (IPv4 traffic only),
      IPv6 (IPv6 traffic only), or
      IPv4v6 (both IPv4 and IPv6 traffic allowed). This latter type has only been available from Release 8 onwards of the 3GPP specifications.
   The APN (access point name) which takes the form of a string. Characters currently allowed for the APN string are:
      characters (A-Z and a-z),
      digits (0-9), and
      the hyphen (-).
   . . . And other parameters A user equipment (3GPP modem 4) operating according to 3GPP Release 8 (or higher), which provides for a context type "IPv4v6" can handle both IPv4 communications and IPv6 communications over the same context, is able to run an application 18*iii* which uses a mixture of IPv4 and IPv6, i.e. using dual-stack connectivity.

Thus, the user equipment is able to initiate activation of a PDP context 20*iii* by transmitting an 'Activate PDP Context Request' message to the SGSN 9. Unless otherwise configured, a user equipment which is IPv4 and IPv6 capable shall request for PDP type IPv4v6. The 'Activate PDP Context Request' message contains the APN that the user equipment wants to connect to.

During the PDP context activation procedure the GGSN 7 checks whether or not the specific APN (identified in the 'Activate PDP Context Request' message) supports the PDP type requested by the user equipment. There are many scenarios where, as a result of this comparison, the SGSN 9 transmits an 'Activate PDP Context Reject' message to the user equipment.

The SGSN 9 may be connected to an access point 12*i* of the GGSN 7 which supports IPv4 only. An access point 12*i* which supports IPv4 only may be present in a network 6 that is configured according to 3GPP Release 7 (or earlier). An access point 12*i* which supports IPv4 only may also be present in a network 6 that is configured according to 3GPP Release 8 (or later).

In this scenario, the user equipment will receive an 'Activate PDP Context Reject' message from the SGSN 9. The 'Activate PDP Context Reject' message may include a reject cause value '00011100' which indicates an 'Unknown PDP address or PDP type'. Alternatively, the 'Activate PDP Context Reject' message may include a reject cause value '00110010' which indicates that 'PDP type IPv4 only allowed'. In response to receiving an 'Activate PDP Context Reject' message having either of these cause values, the user equipment will behave according to 3GPP TS 23.060 section 9.2.

In another scenario, the SGSN 9 may be connected to an access point 12ii of the GGSN 7 which supports IPv6 only. An access point 12ii which supports IPv6 only may be present in a network 6 that is configured according to 3GPP Release 99 (or later). Thus, an access point 12ii which supports IPv6 only may also be present in a network 6 that is configured according to 3GPP Release 8 (or later).

In this scenario, the user equipment will receive an 'Activate PDP Context Reject' message from the SGSN 9. The 'Activate PDP Context Reject' message may include a reject cause value '00011100' which indicates an 'Unknown PDP address or PDP type'. Alternatively, the 'Activate PDP Context Reject' message may include a reject cause value '00110011' which indicates that 'PDP type IPv6 only allowed'. In response to receiving an 'Activate PDP Context Reject' message having either of these cause values, the user equipment will behave according to 3GPP TS 23.060 section 9.2.

In yet another scenario the SGSN 9 may be connected to an access point 12iii of the GGSN 7 which supports both IPv4 and IPv6 but which only permits a single address type (IPv4 or IPv6) per PDP context. An access point 12iii of this type is only present in a network 6 that is configured according to 3GPP Release 8 (or later).

In this scenario, the user equipment will receive an 'Activate PDP Context Reject' message from the SGSN 9. The 'Activate PDP Context Reject' message may include a reject cause value '00110100' which indicates 'Single address bearers only allowed'. In response to receiving an 'Activate PDP Context Reject' message having this cause value, the user equipment will behave according to 3GPP TS 23.060 section 9.2.

For completeness, a brief description of the user equipment behavior according to 3GPP TS 23.060 section 9.2 is now provided. In the scenario when a user equipment requests PDP type IPv4v6, but the user equipment is in part of the network 6 which supports IPv4 or IPv6 only, the PDP type is changed to a single address PDP type (IPv4 or IPv6) and a reason cause is returned to the user equipment indicating that only the assigned PDP type (IPv4 or IPv6) is allowed, the user equipment should not request another PDP context for the other PDP type. In the scenario where a user equipment requests PDP type IPv4v6, and the PDP context is rejected due to 'Unknown PDP type', the user equipment attempts to establish dual stack connectivity by performing two PDP context request procedures to activate an IPv4 PDP context and an IPv4 PDP context, both to the same access point. In the scenario where a user equipment requests PDP type IPv4v6, but the user equipment is in part of the network 6 which uses single addressing per PDP context due to interworking with nodes of earlier releases, the PDP type shall be changed to a single address PDP type and a reason cause of 'Single address bearers only allowed' is returned to the user equipment. In this scenario, the user equipment requests another PDP context for the other PDP type to the same access point with a single address PDP type (IPv4 or IPv6) other than the one already activated.

The disclosure recognizes that the reject causes values in the 'Activate PDP Context Reject' messages that are not always reliable. That is, in all of the scenarios described above, other reject cause values than those described may be included in an 'Activate PDP Context Reject' message. For example, in response to transmitting an IPv4v6 request message in the above scenarios, the 'Activate PDP Context Reject' message may include a reject cause value '00100010' which indicates that 'Service option temporarily out of order', a reject cause value '00100110' which indicates a 'Network Failure', or a reject cause value '00011111' which indicates that 'Activation rejected, unspecified'. Those skilled in the art will appreciate that these are just some examples of the possible reject cause values which may be included in the 'Activate PDP Context Reject' message in the above scenarios.

While these other reject cause values may be present in an 'Activate PDP Context Reject' message when the user equipment has transmitted an IPv4v6 request message, they do not indicate to the user equipment that the request was rejected due to the request being for an IPv4v6 context. Thus in these scenarios the user equipment is not aware that the request was rejected due to the request being for an IPv4v6 context.

For any other reject cause value other than 'Unknown PDP address or PDP type', 'PDP type IPv4 only allowed', 'PDP type IPv6 only allowed', and 'Single address bearers only allowed', the behaviour of the user equipment is not described in the 3GPP standards, which implies that the user equipment fails activation and no further action is taken.

In some embodiments, the disclosure provides a method that enables the user equipment to fall back to IPv4 activation, should the user equipment receive an 'Activate PDP Context Reject' message with a reject cause value other than 'Unknown PDP address or PDP type', 'PDP type IPv4 only allowed', 'PDP type IPv6 only allowed', and 'Single address bearers only allowed'. This method is backward compatible with the current version of the 3GPP standard and all previous versions.

Figure 2:
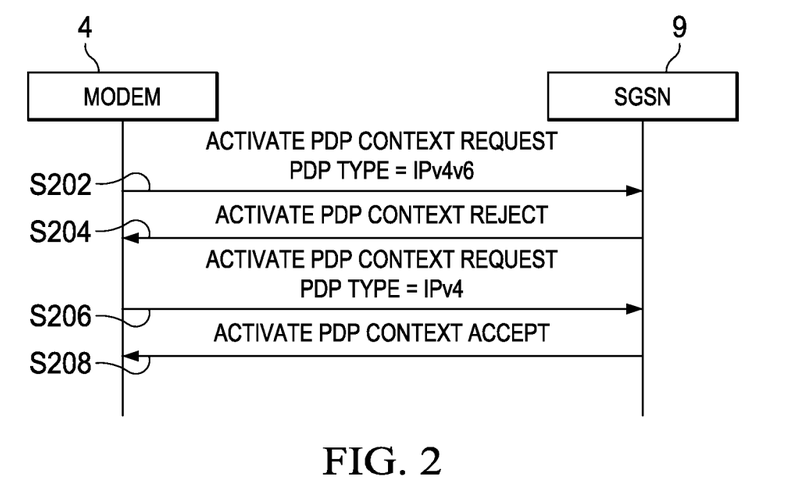
FIG. 2 is a signalling chart representing an embodiment of a method of establishing a context according to the principles of the disclosure.

FIG. 2 is a signalling chart illustrating a method according to an embodiment. In one embodiment, features disclosed herein are implemented in the form of code 35 stored on a non-transitory computer-readable medium 34 of the modem 4 (not necessarily the same physical memory device as the rest of the soft modem code, though it could be) and arranged for execution on the processor 33 of the modem 4 so as when executed to perform the operations of the modem 4 described herein. In some embodiments, some or all of the functionality of the code 35 can be implemented in dedicated hardware.

At step S202 the modem 4, which is configured to handle both IPv4 communications and IPv6 communications over a single context 20iii, transmits an 'Activate PDP Context Request' message to the SGSN 9 of the mobile cellular network 6. The transmission of the 'Activate PDP Context Request' message may be in response to the modem 4 receiving at the second interface apparatus 32, a command from the host 2. This command comprises a field specifying an APN.

The 'Activate PDP Context Request' message is sent to the mobile cellular network 6 to request activation of a PDP context 20iii which can support both IPv4 and IPv6. The 'Activate PDP Context Request' message includes an 8-bit value indicating the PDP type (IPv4v6). A detailed description of the format of the 'Activate PDP Context Request' message is provided in section 9.5.1 of 3GPP TS 24.008, and is not provided herein. The 'Activate PDP Context Request' message further includes the APN that the modem 4 wants to connect to.

Upon receiving the 'Activate PDP Context Request' message from the modem 4, the SGSN 9 transmits a 'Create PDP Context Request' message (not shown in FIG. 2) to the GGSN 7. The 'Create PDP Context Request' message includes the requested PDP type and the APN along with other parameters. The GGSN 7 checks whether or not the specific APN (identified in the 'Create PDP Context Request' message and 'Activate PDP Context Request' message) supports the PDP type (IPv4v6) requested by the modem 4. The access points 12 available to the modem 4 will depend on the geographical location of the modem 4 within the mobile cellular network.

Following this check by the GGSN 7, the GGSN 7 will return a 'Create PDP Context Response' message (not shown in FIG. 2) to the SGSN 9. The SGSN 9 then returns a message back to the modem 4. The modem 4 is able to determine if the PDP context activation was accepted or not by analysing the message received back from the SGSN 9. The modem 4 is able to make this determination by analysing an 8-bit value indicating the message type in the message received at the modem 4. This 8-bit value indicating the message type is a mandatory field according to the 3GPP TS 24.008 standard.

If the access point identified in the 'Activate PDP Context Request' message sent at step S202 supports both IPv4 and IPv6 over a single PDP context 20*iii* then an 'Activate PDP Context Accept' message (not shown in FIG. 2) may be transmitted from the SGSN 9 to the modem 4. The modem 4 is able to determine that the PDP context activation was accepted by analysing the 8 bit value indicating the message type in the message received at the modem 4 from the SGSN 9. A value of '01000010' in the message type field may indicate an 'Activate PDP Context Accept' message.

Following this activation procedure a PDP context 20*iii* (which can support both IPv4 and IPv6 communication) is established between the modem 4 and the SGSN 9.

As indicated above, there are many scenarios where the PDP context activation will not be accepted. In these scenarios the SGSN 9 will transmit an 'Activate PDP Context Reject' message to the modem 4. This is shown in FIG. 2 at step S204, where the SGSN 9 transmits an 'Activate PDP Context Reject' message to the modem 4. The modem 4 is able to determine that the PDP context activation failed by analysing the 8 bit value indicating the message type in the message received at the modem 4 from the SGSN 9 at step S204. A value of '01000011' in the message type field may indicate an 'Activate PDP Context Reject' message.

The 'Activate PDP Context Reject' message received at the modem 4 at step S204 includes an 8-bit cause value. This 8-bit cause value provides an indication about why the PDP context activation was rejected and about any further action that the modem may/must take if any. This 8-bit cause value in an 'Activate PDP Context Reject' message is a mandatory field according to the 3GPP TS 24.008 standard.

Following receipt of an 'Activate PDP Context Reject' message at step S204, the modem 4 analyses the 8-bit cause value in the 'Activate PDP Context Reject' message to determine the action that should be taken by the modem.

If the 8-bit cause value indicates 'Unknown PDP address or PDP type', 'PDP type IPv4 only allowed', 'PDP type IPv6 only allowed', or 'Single address bearers only allowed'), the modem 4 will behave according to 3GPP TS 23.060 section 9.2.

For any other 8-bit cause value in the 'Activate PDP Context Reject' message, the modem 4 is arranged to attempt IPv4 activation. That is, at step S206 the modem 4 is arranged to transmit a further 'Activate PDP Context Request' message to the SGSN 9 of the mobile cellular network 6 to request activation of a PDP context 20*i* (operating exclusively based on IPv4). The 'Activate PDP Context Request' message sent at step S206 includes an 8-bit value indicating the PDP type (IPv4). The IPv4 'Activate PDP Context Request' message sent at step S206 further includes the APN that the modem 4 wants to connect to. The APN identified in the 'Activate PDP Context Request' sent at step S206 may be the same as the APN identified in the 'Activate PDP Context Request' sent at S202 or another APN that would be used for IPv4-only connectivity. The modem may be provided with this latter APN in a way that is out of the scope of embodiments of this disclosure.

Upon receiving the further IPv4 'Activate PDP Context Request' message transmitted from the modem 4, the SGSN 9 transmits a 'Create PDP Context Request' message to the GGSN 7. The 'Create PDP Context Request' message includes the requested PDP type and the APN along with other parameters. The GGSN 7 checks whether or not the specific APN (identified in the 'Create PDP Context Request' message and 'Activate PDP Context Request' message) supports the PDP type (IPv4) requested by the modem 4.

If the access point identified in the IPv4 'Activate PDP Context Request' message supports IPv4 then an 'Activate PDP Context Accept' message is transmitted from the SGSN 9 to the modem 4 at step S208. The modem 4 is able to determine that the 'Activate PDP Context Request' message was accepted by analysing the 8-bit value indicating the message type in the message received from the SGSN 9 at step S208 as described above. Following this activation procedure a PDP context 20*i* (operating exclusively based on IPv4) is established between the modem 4 and the SGSN 9.

Internet providers offer widespread coverage of IPv4. Access points 12*i* which supports IPv4 only may be present in a network 6 that is configured according to 3GPP Release 7 (or earlier) and may also be present in a network 6 that is configured according to 3GPP Release 8 (or later). Thus, due to the widespread use of IPv4 it is highly likely that the further 'Activate PDP Context Request' message transmitted from the modem 4 at step S206 will be successful and an 'Activate PDP Context Accept' message will be received at the modem 4.

If the access point identified in the IPv4 'Activate PDP Context Request' message does not support IPv4 then an 'Activate PDP Context Reject' message (not shown in FIG. 2) is transmitted to the modem 4. The modem 4 is able to determine that the further IPv4 'Activate PDP Context Request' message transmitted at step S206 was rejected by analysing an 8-bit value in the 'Activate PDP Context Reject' message received from the SGSN 9 as described above.

Upon determining failure of the IPv4 activation, the modem 4 is arranged to attempt IPv6 activation. That is, the modem 4 is arranged to transmit an IPv6 'Activate PDP Context Request' message to the SGSN 9 of the mobile cellular network 6 to request activation of a PDP context 20*ii* (operating exclusively based on IPv6). This 'Activate PDP Context Request' message includes an 8-bit value indicating the PDP type (IPv6). The IPv6 'Activate PDP Context Request' message further includes the APN that the modem 4 wants to connect to. The APN identified in the IPv6 'Activate PDP Context Request' may be the same as the APN identified in the 'Activate PDP Context Request' sent at S202 and S206 or another APN that would be used for IPv6-only connectivity. The modem may be provided with this latter APN in a way that is out of the scope of embodiments of this disclosure.

Upon receiving the IPv6 'Activate PDP Context Request' message transmitted from the modem 4, the SGSN 9 transmits a 'Create PDP Context Request' message to the GGSN 7. The 'Create PDP Context Request' message includes the requested PDP type and the APN along with other parameters. The GGSN 7 checks whether or not the specific APN (identified in the 'Create PDP Context Request' message and 'Activate PDP Context Request' message) supports the PDP type (IPv6) requested by the modem 4.

If the access point identified in the IPv6 'Activate PDP Context Request' message supports IPv6 then an 'Activate PDP Context Accept' message is transmitted from the SGSN 9 to the modem 4. The modem 4 is able to determine that the IPv6 'Activate PDP Context Request' message was accepted by analysing an 8-bit value in the 'Activate PDP Context Accept' message received from the SGSN 9 as described above. Following this activation procedure a PDP context 20ii (operating exclusively based on IPv6) is established between the modem 4 and the SGSN 9.

If the access point identified in the IPv6 'Activate PDP Context Request' message does not support IPv6 then an 'Activate PDP Context Reject' message (not shown in FIG. 2) is transmitted from the SGSN 9 to the modem 4. The modem 4 is able to determine that the IPv6 'Activate PDP Context Request' message was rejected by analysing an 8-bit value in the 'Activate PDP Context Reject' message received from the SGSN 9 as described above.

Upon determining failure of the IPv6 activation, modem 4 determines that the PDP context activation procedure has failed and no further action is taken. The modem may report to the host terminal 2 that the PDP context activation procedure has failed. In this case, the next action will come from the host, if any.

Embodiments disclosed herein ensure backward compatibility on any non-IPv6 capable networks. That is, when the dual stack modem 4 is present in a mobile cellular network 6 that is configured according to 3GPP Release 7 (or earlier), the modem 4 is still able to establish a PDP context (context 20i) with the mobile cellular network 6. Embodiments are not limited to when the dual stack modem 4 is present in a mobile cellular network 6 that is configured according to 3GPP Release 7 (or earlier). That is, disclosed embodiments are compatible with the current version of the 3GPP standard and all previous versions. This enables the dual stack modem 4 to fall back to IPv4 activation, i.e. establish a PDP context (context 20i) with the mobile cellular network 6, when the modem 4 receives an 'Activate PDP Context Reject' which does not indicate that an 'Activate PDP Context Request' was rejected due to no access point of the wireless cellular network being arranged to support both IPv4 and IPv6 communications on a single channel.

It will be appreciated that the above embodiments have been described only by way of example, and other variants or applications may be apparent to a person skilled in the art given the disclosure herein.

For instance, while embodiments above have been described in relation to certain standards such as 3GPP networks, Internet Protocol, and so forth, these are not intended to be limiting and the disclosure may in fact be applied within any communication standard of any mobile cellular network, and of any further, packet-based network if such a network is involved. Further, while the above has been described in terms of a SGSN and a GGSN, it will be understood that this is only exemplary and the above description could equally be made by reference to any serving support entity or gateway support entity. For example in an LTE core network, the serving support entity could be a Serving Gateway (SGW) rather than a SGSN and the gateway support entity could be a PDN Gateway (PGW) rather than a GGSN. Further, the term "access point name" or such like does not necessarily imply the APN of any particular standard such as a 3GPP standard. Nor do the terms "context" or "channel" imply a specific nature or standard, but can be used to refer to any kind of suitable data conduit or session established between a modem and a network The apparatuses and methods described herein, or at least a portion thereof, may be embodied in or performed by various conventional digital data processors or computers, wherein the processors are programmed or store executable programs of sequences of software instructions to perform one or more of the steps of the methods or sequences. The software instructions of such programs may represent algorithms and be encoded in machine-executable form on non-transitory digital data storage media, e.g., magnetic or optical disks, random-access memory (RAM), magnetic hard disks, flash memories, and/or read-only memory (ROM), to enable various types of digital data processors or computers to perform one, multiple or all of the steps of one or more of the above-described methods, e.g., one or more of the steps of the method, or functions of the apparatuses described herein. Additionally, an apparatus may be designed to include the necessary circuitry to perform each of or at least some of the step of the disclosed methods or functions.

Certain embodiments of the invention or portions thereof may further relate to computer storage products with a non-transitory computer-readable medium that have program code stored thereon for performing various computer-implemented operations that embody the tools or carry out the steps of the methods set forth herein. Non-transitory used herein refers to all computer-readable media except for transitory, propagating signals. Examples of non-transitory computer-readable media include, but are not limited to: magnetic media such as hard disks, floppy disks, and magnetic tape; optical media such as CD-ROM disks; magneto-optical media such as floptical disks; and hardware devices that are specially configured to store and execute program code, such as ROM and RAM devices. Examples of program code include both machine code, such as produced by a compiler, and files containing higher level code that may be executed by the computer using an interpreter.

This disclosure is not limited by the described examples but only by the appended claims.

The invention claimed is:

1. A modem for use at a terminal, the modem comprising:
    first interface apparatus comprising a first wireless transceiver arranged to connect to a wireless cellular network;
    second interface apparatus arranged to connect to the terminal; and
    processing apparatus arranged to transmit a first request message to a part of the wireless cellular network to request establishment of a channel to access a further, packet-based network via the first interface apparatus, wherein the first request message requests said channel as being of a type that supports both a first and second version of a packet protocol;
    wherein the processing apparatus is further arranged to receive a first response message via the first interface apparatus, the first response message indicating rejection of the first request,
    wherein the processing apparatus is further arranged, upon detecting that a field in the first response message defines a reason other than said part of the wireless cellular network does not support first and second versions of the packet protocol on a single channel, to default to transmit a default request message to said part of the wireless cellular network to request establishment of a channel to access the further, packet-based network via the first interface apparatus, wherein the default request message requests said channel as being of a type that supports the first version of the packet protocol.

2. The modem of claim 1, wherein the processing apparatus is configured to receive an acceptance message via the first interface apparatus accepting establishment of the channel in response to the transmission of the second request message when said part of the wireless cellular network supports communications in accordance with the first version of the packet protocol.

3. The modem of claim 1, wherein the processing apparatus is configured to receive a second response message via the first interface apparatus when said part of the wireless cellular network does not support communications in accordance with the first version of the packet protocol, the second response message indicating rejection of the second request.

4. The modem of claim 3, wherein the processing apparatus is configured to, in response to receiving the second response message, transmit a further default request message to said part of the wireless cellular network to request establishment of a channel to access the further, packet-based network via the first interface apparatus, wherein the further default request message requests said channel as being of a type that supports the second version of the packet protocol.

5. The modem of claim 4, wherein the processing apparatus is configured to receive an acceptance message via the first interface apparatus accepting establishment of the channel in response to the transmission of the third request message when said part of the wireless cellular network supports communications in accordance with the second version of the packet protocol.

6. The modem of claim 1, wherein the processing apparatus is configured to receive an acceptance message via the first interface apparatus accepting establishment of the channel in response to the transmission of the first request message when said part of the wireless cellular network supports communications in accordance with first and second versions of the packet protocol on a single channel.

7. The modem of claim 1, wherein the processing apparatus is arranged to determine if the field in the first response message indicates that the first request was rejected due to said part of the wireless cellular network not supporting communications in accordance with first and second versions of the packet protocol on a single channel.

8. The modem of claim 1, wherein the channel comprises one of a PDP context and an EPS bearer context.

9. The modem of claim 8, wherein said part of the wireless cellular network comprises one or more access points including an access point that only supports communications in accordance with the first version of the packet protocol, and the processing apparatus is configured to establish a context of a type which allows communications based on the first version of the packet protocol with the access point that only supports communications in accordance with the first version of the packet protocol.

10. The modem of claim 8, wherein said part of the wireless cellular network comprises one or more access points including an access point that only supports communications in accordance with the second version of the packet protocol, and the processing apparatus is configured to establish a context of a type which allows communications based on the second version of the packet protocol with the access point that only supports communications in accordance with the second version of the packet protocol.

11. The modem of claim 8, wherein said part of the wireless cellular network comprises one or more access points including an access point that supports communications in accordance with first and second versions of the packet protocol on a single channel, and the processing apparatus is configured to establish a context which allows communications based on the first and second versions of the packet protocol with the access point that supports communications in accordance with first and second versions of the packet protocol on a single channel.

12. The modem of claim 1, wherein the field in the first response message includes an 8-bit binary value.

13. The modem of claim 12, wherein the processing apparatus is arranged to transmit the second request message to said part of the wireless cellular network when the 8-bit binary value has a value other than:
   00011100;
   00110010;
   00110011; or
   00110100.

14. The modem of claim 1, wherein the processing apparatus is arranged to transmit the second request message to said part of the wireless cellular network when the field in the first response message defines a reason other than:
   i) said part of the wireless cellular network does not recognise an address or packet protocol version of the first request message; or
   ii) said part of the wireless cellular network only supports communications in accordance with the first version of the packet protocol; or
   iii) said part of the wireless cellular network only supports communications in accordance with the second version of the packet protocol; or
   iv) said part of the wireless cellular network only supports communications in accordance with a single version of a packet protocol on a single channel.

15. The modem of claim 1, wherein the single version of a packet protocol is one of the first version of the packet protocol and the second version of the packet protocol.

16. The modem of claim 1, wherein the first version of the packet protocol is IPv4.

17. The modem of claim 1, wherein the second version of the packet protocol is IPv6.

18. The modem of claim 1, wherein the processing apparatus is arranged to transmit the first request message to said part of the wireless cellular network in response to receiving a modem command from the terminal via the second interface apparatus.

19. The modem of claim 1, wherein the further network is the Internet.

20. The modem of claim 1, wherein the wireless cellular network is a 3GPP network.

21. The modem of claim 1, wherein the second interface apparatus comprises a wired connector or connection.

22. The modem of claim 1, wherein the modem comprises an external unit for use at the terminal.

23. The modem of claim 22, wherein the second interface apparatus comprises a wired connector.

24. The modem of claim 22, wherein the modem comprises a dongle housing said processing apparatus and for plugging into said terminal via the second interface apparatus.

25. The modem of claim 22, wherein the second interface apparatus comprises a second wireless transceiver for connecting to the terminal via a local wireless connection.

26. The modem of claim 1, wherein the modem comprises a mobile phone housing for connecting to said terminal via the second interface apparatus, the mobile phone thus being operable as a telephone and as an external wireless cellular modem for the terminal.

27. A computer program product for operating a modem for use at a terminal, the modem having a processing apparatus, a first interface apparatus comprising a first wireless transceiver for connecting to a wireless cellular network, and a second interface apparatus for connecting to the terminal;
 wherein the computer program product comprises code stored on a non-transitory computer-readable medium and configured so as when executed to direct operation of the processing apparatus of said modem to:
  transmit a first request message to a part of the wireless cellular network to request establishment of a channel to access a further, packet-based network via the first interface apparatus, wherein the first request message requests said as being of a type that supports both a first and second version of a packet protocol;
 wherein the processing apparatus is configured to receive a first response message via the first interface apparatus, the first response message indicating rejection of the first request, and the code is configured so as when executed to, upon detecting that a field in the first response message defines a reason other than said part of the wireless cellular network does not support first and second versions of the packet protocol on a single channel, transmit a default request message to said part of the wireless cellular network to request establishment of a channel to access the further, packet-based network via the first interface apparatus, wherein the default request message requests said channel as being of a type that supports the first version of the packet protocol.

28. A method of operating a modem at a terminal, the modem having a first interface apparatus comprising a first wireless transceiver for connecting to a wireless cellular network, a second interface apparatus for connecting to the terminal, wherein the method comprises:
 transmitting a first request message to a part of the wireless cellular network to request establishment of a channel to access a further, packet-based network via the first interface apparatus, wherein the first request message requests said as being of a type that supports both a first and second version of a packet protocol;
 receiving a first response message via the first interface apparatus, the first response message indicating rejection of the first request, and
 upon detecting that a field in the first response message defines a reason other than said part of the wireless cellular network does not support first and second versions of the packet protocol on a single channel, the method further comprising:
 transmitting a default request message to said part of the wireless cellular network to request establishment of a channel to access the further, packet-based network via the first interface apparatus, wherein the default request message requests said channel as being of a type that supports the first version of the packet protocol.

29. A system comprising:
 a terminal;
 a wireless cellular network; and
 a modem for use at the terminal, the modem comprising:
 first interface apparatus comprising a first wireless transceiver arranged to connect to a wireless cellular network;
 second interface apparatus arranged to connect to the terminal; and
 processing apparatus arranged to transmit a first request message to a part of the wireless cellular network to request establishment of a channel to access a further, packet-based network via the first interface apparatus, wherein the first request message requests said channel as being of a type that supports both a first and second version of a packet protocol;
 wherein the processing apparatus is further arranged to receive a first response message via the first interface apparatus, the first response message indicating rejection of the first request,
 wherein the processing apparatus is further arranged, upon detecting that a field in the first response message defines a reason other than said part of the wireless cellular network does not support first and second versions of the packet protocol on a single channel, to default to transmit a default request message to said part of the wireless cellular network to request establishment of a channel to access the further, packet-based network via the first interface apparatus, wherein the default request message requests said channel as being of a type that supports the first version of the packet protocol.

\* \* \* \* \*